(12) United States Patent
Speer

(10) Patent No.: US 6,564,613 B1
(45) Date of Patent: May 20, 2003

(54) AIR CONDITIONER LINE LEAK TESTER

(76) Inventor: Michael R. Speer, 10980 Reed Rd., Edgerton, WI (US) 53534

( * ) Notice: Subject to any disclaimer, the term of this patent is extended or adjusted under 35 U.S.C. 154(b) by 0 days.

(21) Appl. No.: 09/910,259

(22) Filed: Jul. 20, 2001

(51) Int. Cl.[7] ................................................. G01M 3/04
(52) U.S. Cl. ................................................... 73/40.5 R
(58) Field of Search ............................... 73/40.5 R, 40, 73/40.7, 49.2, 49.7; 62/77, 125

(56) References Cited

U.S. PATENT DOCUMENTS

| | | | | |
|---|---|---|---|---|
| 2,238,958 A | * | 4/1941 | Wells ............................ | 73/151 |
| 3,118,463 A | * | 1/1964 | Lacart .......................... | 137/343 |
| 4,109,536 A | * | 8/1978 | Strybel ......................... | 73/756 |
| 4,319,492 A | * | 3/1982 | Hewson et al. ................ | 73/756 |
| 4,396,150 A | * | 8/1983 | Burrough ...................... | 239/75 |
| 4,685,941 A | * | 8/1987 | Sato .............................. | 55/163 |
| 4,881,961 A | * | 11/1989 | Mock ............................ | 62/292 |
| 5,170,632 A | * | 12/1992 | Reilly, Jr. et al. ............. | 62/77 |
| 5,327,735 A | * | 7/1994 | Hatton .......................... | 62/292 |
| 5,540,254 A | * | 7/1996 | McGowan et al. ............ | 137/315 |
| 5,558,124 A | * | 9/1996 | Randall ........................ | 137/597 |
| 5,603,224 A | * | 2/1997 | Scaringe et al. .............. | 62/125 |

* cited by examiner

*Primary Examiner*—Helen Kwok
*Assistant Examiner*—C D Garber

(57) ABSTRACT

An air conditioner line leak tester for testing for any leaks in an air conditioner system without risking loss of coolant into the atmosphere. The device comprises a housing having first and second air pressure gauges mounted on and extending into the housing. A first tubular member is fluidly coupled to the first air pressure gauge and has a free end adapted for removably coupling a lower pressure side of the air conditioner. A second tubular member is fluidly coupled to the second air pressure gauge and a free end adapted for removably coupling a higher pressure side of the air conditioner. A one way valve is coupled to the first and second tubular members. A supply conduit is removably coupled to the one way valve for supplying pressured air to the first and second tubular members for measuring air pressure in the lower and higher sides.

1 Claim, 3 Drawing Sheets

AIR CONDITIONER LINE LEAK TESTER

BACKGROUND OF THE INVENTION

1. Field of the Invention

The present invention relates to line leak testing devices and more particularly pertains to a new air conditioner line leak tester for testing for any leaks in an air conditioner system without risking loss of coolant into the atmosphere.

2. Description of the Prior Art

The use of line leak testing devices is known in the prior art. More specifically, line leak testing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,419,177; U.S. Pat. No. 4,110,998; U.S. Pat. No. 5,345,774; U.S. Pat. No. 5,226,300; U.S. Pat. No. 4,923,806; and U.S. Pat. No. 100,193.

While these devices fulfill their respective, particular objectives and requirements, the aforementioned patents do not disclose a new air conditioner line leak tester. The inventive device includes a device for removably attaching to a low pressure side and a high pressure side of an air conditioner. The device comprises a housing has a top wall having first and second air pressure gauges mounted on and extending into the housing. A first tubular member is fluidly coupled to the first air pressure gauge and has a free end adapted for removably coupling the lower pressure side of the air conditioner. A second tubular member is fluidly coupled to the second air pressure gauge and a free end adapted for removably coupling the higher pressure side of the air conditioner. A one way valve is mounted on the housing. The one way valve is coupled to the first and second tubular members such that air entering the one way valve may enter the first and second tubular members. A supply conduit is removably coupled to the one way valve for supplying pressured air to the first and second tubular members. Air may flow under pressure through the one way valve and into the first and second tubular members such that the changes in air pressure may be measured by the first and second air pressure gauges.

In these respects, the air conditioner line leak tester according to the present invention substantially departs from the conventional concepts and designs of the prior art, and in so doing provides an apparatus primarily developed for the purpose of testing for any leaks in an air conditioner system without risking loss of coolant into the atmosphere.

SUMMARY OF THE INVENTION

In view of the foregoing disadvantages inherent in the known types of line leak testing devices now present in the prior art, the present invention provides a new air conditioner line leak tester construction wherein the same can be utilized for testing for any leaks in an air conditioner system without risking loss of coolant into the atmosphere.

The general purpose of the present invention, which will be described subsequently in greater detail, is to provide a new air conditioner line leak tester apparatus and method which has many of the advantages of the line leak testing devices mentioned heretofore and many novel features that result in a new air conditioner line leak tester which is not anticipated, rendered obvious, suggested, or even implied by any of the prior art line leak testing devices, either alone or in any combination thereof.

To attain this, the present invention generally comprises a device for removably attaching to a low pressure side and a high pressure side of an air conditioner. The device comprises a housing has a top wall having first and second air pressure gauges mounted on and extending into the housing. A first tubular member is fluidly coupled to the first air pressure gauge and has a free end adapted for removably coupling the lower pressure side of the air conditioner. A second tubular member is fluidly coupled to the second air pressure gauge and a free end adapted for removably coupling the higher pressure side of the air conditioner. A one way valve is mounted on the housing. The one way valve is coupled to the first and second tubular members such that air entering the one way valve may enter the first and second tubular members. A supply conduit is removably coupled to the one way valve for supplying pressured air to the first and second tubular members. Air may flow under pressure through the one way valve and into the first and second tubular members such that the changes in air pressure may be measured by the first and second air pressure gauges.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new air conditioner line leak tester apparatus and method which has many of the advantages of the line leak testing devices mentioned heretofore and many novel features that result in a new air conditioner line leak tester which is not anticipated, rendered obvious, suggested, or even implied by any of the prior art line leak testing devices, either alone or in any combination thereof.

It is another object of the present invention to provide a new air conditioner line leak tester which may be easily and efficiently manufactured and marketed.

It is a further object of the present invention to provide a new air conditioner line leak tester which is of a durable and reliable construction.

An even further object of the present invention is to provide a new air conditioner line leak tester which is susceptible of a low cost of manufacture with regard to both materials and labor, and which accordingly is then susceptible of low prices of sale to the consuming public, thereby making such air conditioner line leak tester economically available to the buying public.

Still yet another object of the present invention is to provide a new air conditioner line leak tester which provides in the apparatuses and methods of the prior art some of the advantages thereof, while simultaneously overcoming some of the disadvantages normally associated therewith.

Still another object of the present invention is to provide a new air conditioner line leak tester for testing for any leaks in an air conditioner system without risking loss of coolant into the atmosphere.

Yet another object of the present invention is to provide a new air conditioner line leak tester which includes a device for removably attaching to a low pressure side and a high pressure side of an air conditioner. The device comprises a housing has a top wall having first and second air pressure gauges mounted on and extending into the housing. A first tubular member is fluidly coupled to the first air pressure gauge and has a free end adapted for removably coupling the lower pressure side of the air conditioner. A second tubular member is fluidly coupled to the second air pressure gauge and a free end adapted for removably coupling the higher pressure side of the air conditioner. A one way valve is mounted on the housing. The one way valve is coupled to the first and second tubular members such that air entering the one way valve may enter the first and second tubular members. A supply conduit is removably coupled to the one way valve for supplying pressured air to the first and second tubular members. Air may flow under pressure through the one way valve and into the first and second tubular members such that the changes in air pressure may be measured by the first and second air pressure gauges.

Still yet another object of the present invention is to provide a new air conditioner line leak tester that tests each of the high and low pressure portions of an air conditioning system using pressured air to determine where a leak may exist without loss of coolant to the atmosphere.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
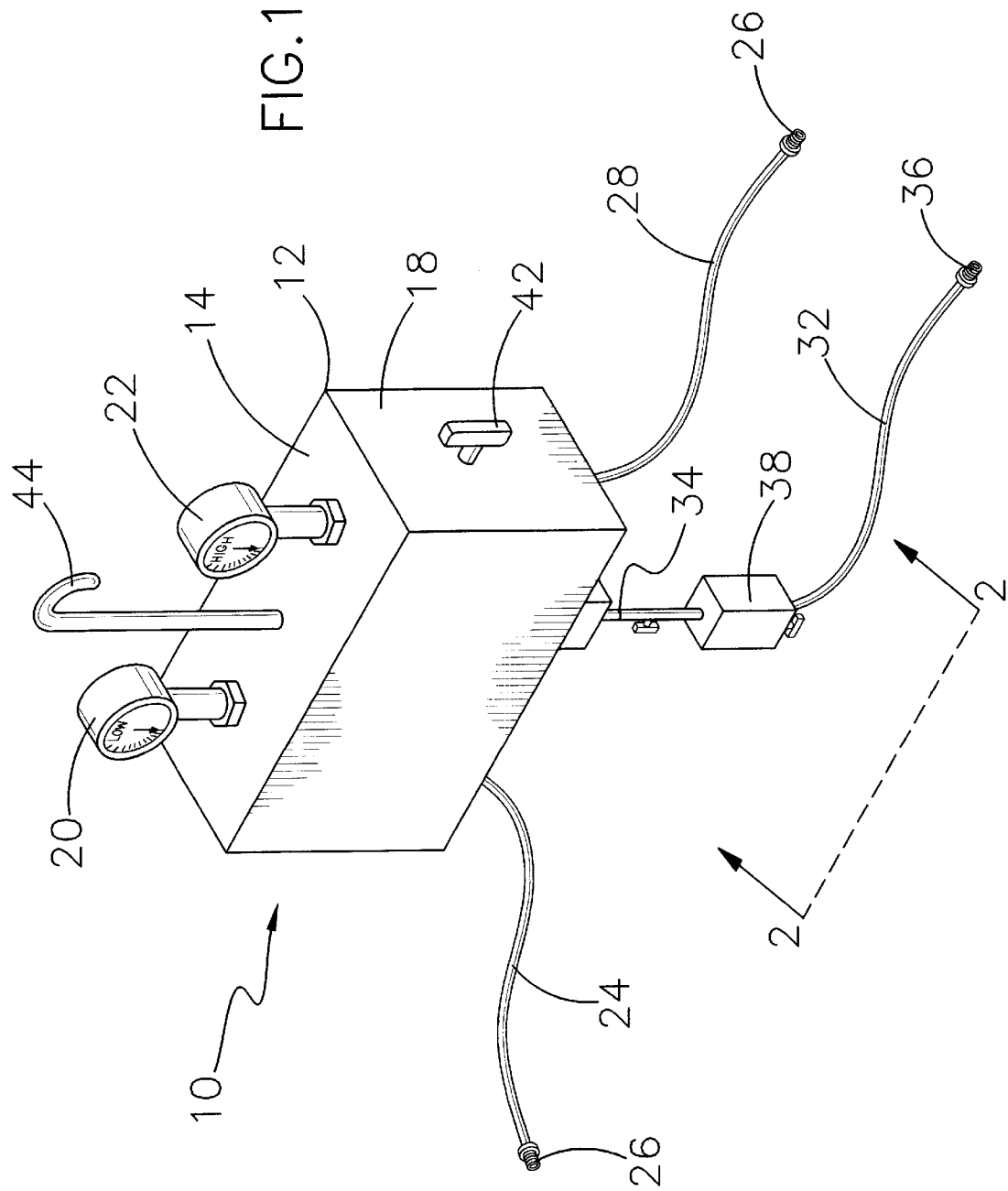
FIG. 1 is a schematic perspective view of a new air conditioner line leak tester according to the present invention.
Figure 2:
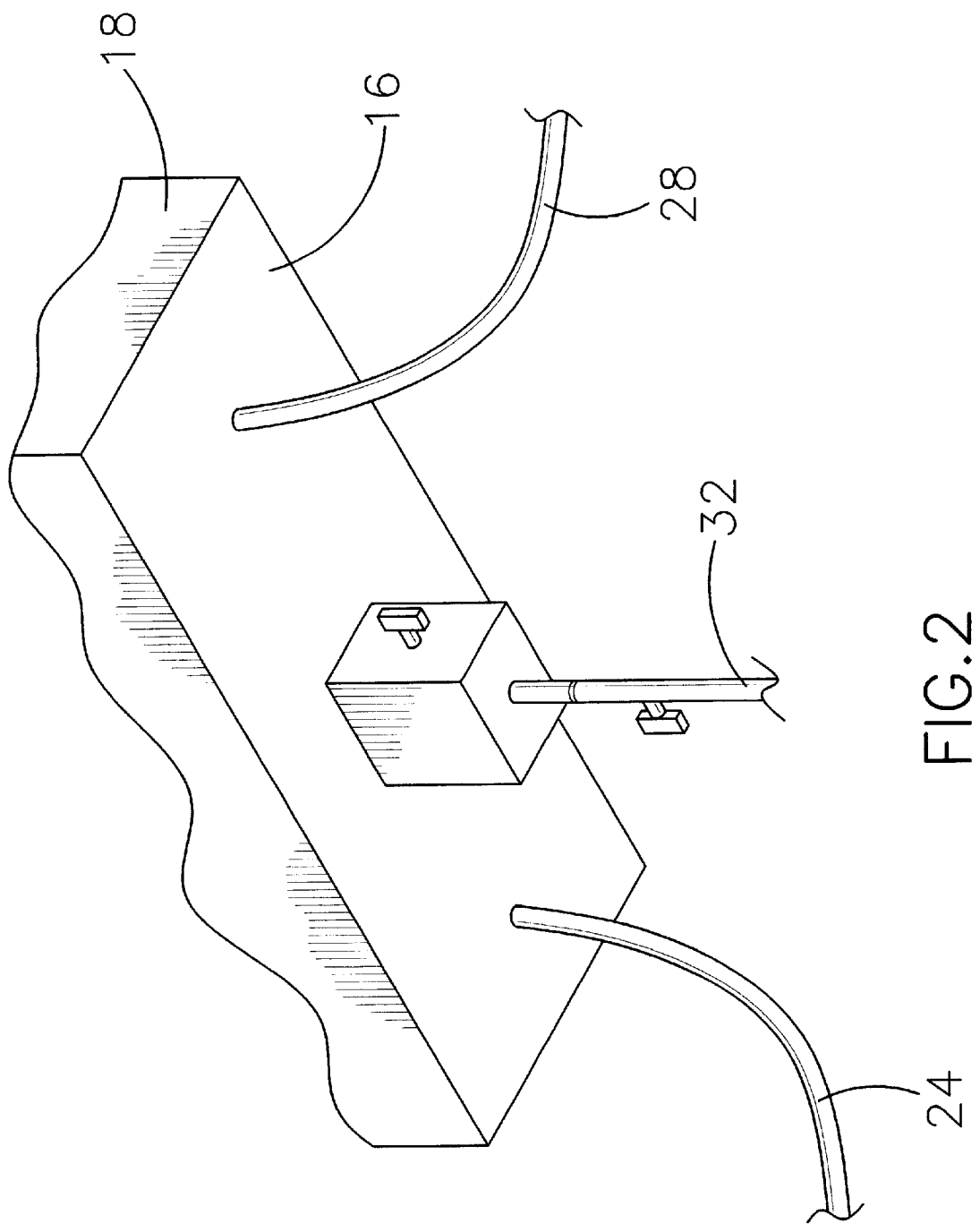
FIG. 2 is a schematic perspective view of the present invention.
Figure 3:
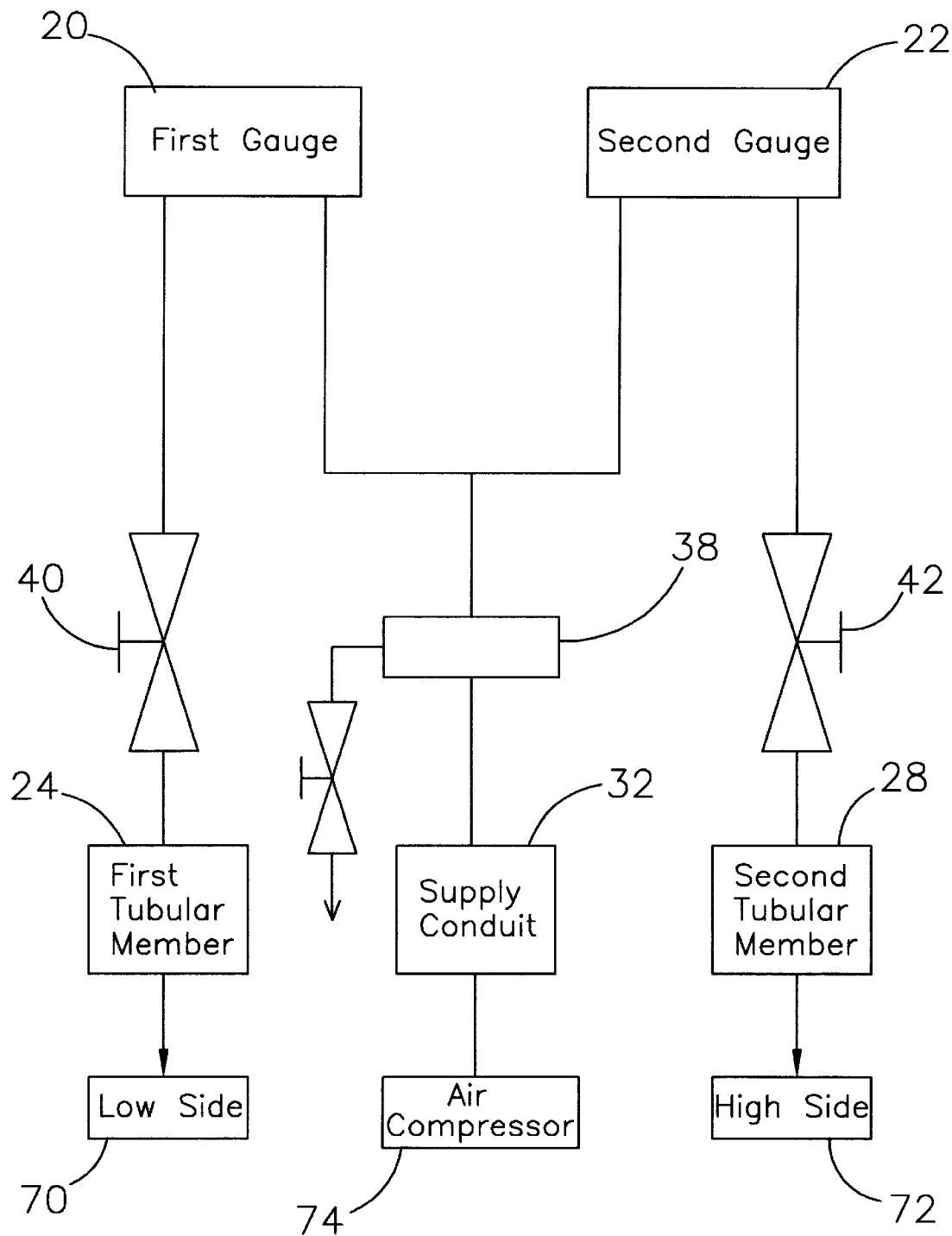
FIG. 3 is a schematic view of the present invention.

With reference now to the drawings, and in particular to FIGS. 1 through 3 thereof, a new air conditioner line leak tester embodying the principles and concepts of the present invention and generally designated by the reference numeral 10 will be described.

As best illustrated in FIGS. 1 through 3, the air conditioner line leak tester 10 generally comprises a coolant leak testing device for removably attaching to a low pressure side 70 and a high pressure side 72 of an air conditioner of a conventional vehicle air conditioning system. The device 10 includes a housing 12 having a top wall 14, a bottom wall 16 and a peripheral wall 18 extending between the top 14 and bottom 16 walls. A first air pressure gauge 20 is mounted on the top wall 14 and extends into the housing 12. A second air pressure gauge 22 is mounted on the top wall 14 and extends into housing 12.

A first tubular member 24 extends into the housing 12 and is fluidly coupled to the first air pressure gauge 20. The first tubular 24 member has a free end having a coupler 26 thereon adapted for fluidly coupling the lower pressure side 70 of the air conditioner.

A second tubular member 28 extends into the housing 12 and is fluidly coupled to the second air pressure gauge 22. The second tubular member 28 has a free end having a coupler 26 thereon adapted for fluidly coupling the higher pressure side 72 of the air conditioner.

A one way valve 30 is mounted on the housing 12. The one way valve 30 is in communication to the first 24 and second 28 tubular members such that air entering the one way valve 30 may enter the first 24 and second 28 tubular members. The air in the first tubular member 24 does not commingle with air in the second tubular 28 member.

A supply conduit 32 is elongated and has a first end 34 and a second end 36. The first end 34 of the supply conduit 32 is removably couplable to the one way valve 30 for supplying air to the one way valve 30. The second end 36 is removably couplable to an air compressor 74. The supply conduit 32 is in communication with a water trap 38 for removing any water which may be in the air supplied from the air compressor 74.

A first shut off valve 40 for selectively closing the first tubular member 24 is mounted on the peripheral wall 18 and is operationally coupled to the first tubular member 24.

A second shut off valve 42 for selectively closing the second tubular member 28 is mounted on the peripheral wall 18 and is operationally coupled to the second tubular member 28.

A hook 44 is attached to the top wall 14 of the housing 12. The hook 44 is used for hanging the device while in use or in storage.

In use, air may flow under pressure through the one way valve 30 and into the first 24 and second 28 tubular members. Once the tubular members 24 28 have pressurized air therein, the air supply is cut and the gauges 20, 22 monitored to see if any loss of pressure is detected. This allows the air conditioner lines to be tested without worry of loss of coolant from the air conditioner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coolant leak testing device for removably attaching to a low pressure side and a high pressure side of an air conditioner, said device comprising:

a housing having a top wall, a bottom wall and a peripheral wall extending between said top and bottom walls, a first air pressure gauge being mounted on said top wall and extending into said housing, a second air pressure gauge being mounted on said top wall and extending into housing;

a first tubular member extending into said housing and being fluidly coupled to said first air pressure gauge, said first tubular member having a free end having a coupler thereon adapted for fluidly coupling the lower pressure side of the air conditioner;

a second tubular member extending into said housing and being fluidly coupled to said second air pressure gauge, said second tubular member having a free end having a coupler thereon adapted for fluidly coupling the higher pressure side of the air conditioner;

a one way valve being mounted on said housing, said one way valve being in communication with said first and second tubular members;

a supply conduit being elongated and having a first end and a second end, said first end of said supply conduit being removably couplable to said one way valve for supplying air to said one way valve, said second end being removably couplable to an air compressor;

a water trap being in communication between said supply conduit and said one way valve such that said water trap is adapted for removing moisture from the pressurized air supplied to said one way valve;

a first shut off valve for selectively closing said first tubular member, said first shut off valve being mounted on said peripheral wall and being operationally coupled to said first tubular member;

a second shut off valve selectively closing said second tubular member, said second shut off valve being mounted on said peripheral wall and being operationally coupled to said second tubular member;

a hook being attached to said top wall of said housing; and wherein air may flow under pressure through said one way valve and into said first and second tubular members such that said changes in air pressure may be measured by said and second air pressure gauges.

* * * * *